US008718297B1

(12) United States Patent
Norris

(10) Patent No.: US 8,718,297 B1
(45) Date of Patent: May 6, 2014

(54) PARAMETRIC TRANSDUCER AND RELATED METHODS

(71) Applicant: Parametric Sound Corporation, Poway, CA (US)

(72) Inventor: Elwood Grant Norris, Poway, CA (US)

(73) Assignee: Parametric Sound Corporation, Poway, CA (US)

( * ) Notice: Subject to any disclaimer, the term of this patent is extended or adjusted under 35 U.S.C. 154(b) by 0 days.

(21) Appl. No.: 13/772,255

(22) Filed: Feb. 20, 2013

(51) Int. Cl.
*H04B 3/00* (2006.01)
*H04R 3/00* (2006.01)

(52) U.S. Cl.
USPC ............................................ 381/77; 381/111

(58) Field of Classification Search
USPC ............................ 381/173, 190, 191, 111, 77
See application file for complete search history.

(56) References Cited

U.S. PATENT DOCUMENTS

| | | | | |
|---|---|---|---|---|
| 7,873,174 | B2 * | 1/2011 | Yoshino et al. | 381/77 |
| 7,907,740 | B2 * | 3/2011 | Matsuzawa | 381/111 |
| 8,130,973 | B2 * | 3/2012 | Uetake et al. | 381/77 |
| 2005/0244016 | A1 * | 11/2005 | Norris et al. | 381/77 |
| 2008/0152172 | A1 * | 6/2008 | Matsuzawa | 381/116 |
| 2008/0175404 | A1 * | 7/2008 | Bank et al. | 381/77 |

* cited by examiner

*Primary Examiner* — Vivian Chin
*Assistant Examiner* — David Ton
(74) *Attorney, Agent, or Firm* — Sheppard Mullin Richter & Hampton LLP

(57) ABSTRACT

An ultrasonic audio speaker includes an emitter and a driver. The emitter can include a first layer having a conductive surface; a second layer having a conductive surface; and an insulating layer disposed between the first and second conductive surfaces, wherein the first and second layers are disposed in touching relation to the insulating layer. The driver circuit can include two inputs configured to be coupled to receive an audio modulated ultrasonic signal from an amplifier and two outputs, wherein a first output is coupled to the conductive surface of the first layer and the second output is coupled to the conductive surface of the second layer.

20 Claims, 10 Drawing Sheets

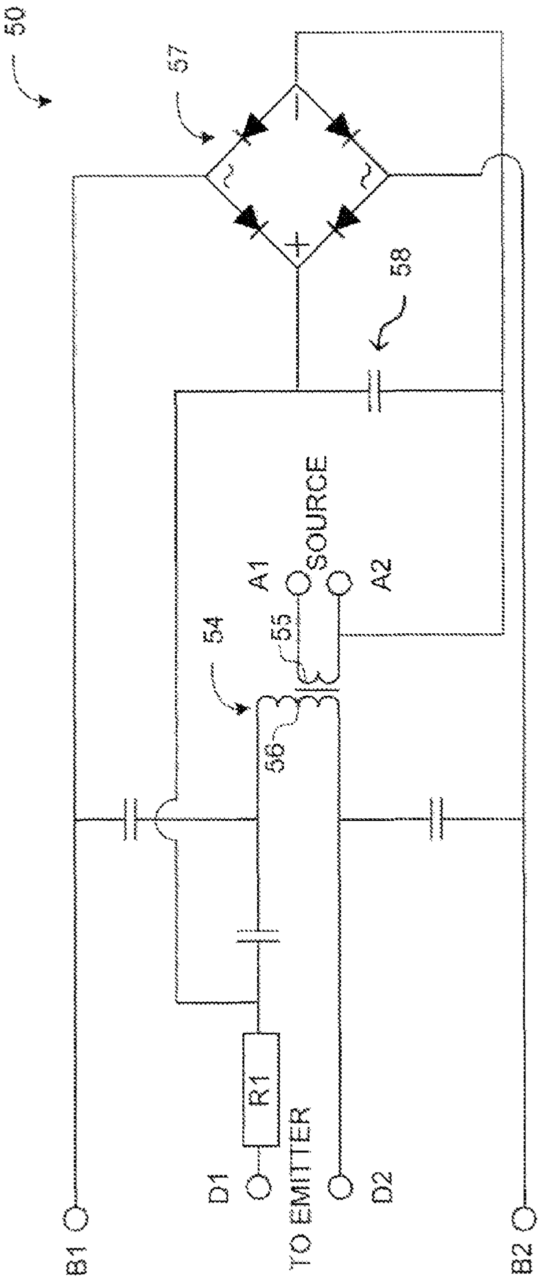
Fig. 6a
Fig. 6b
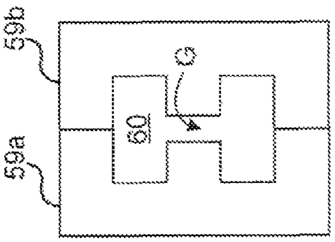

PARAMETRIC TRANSDUCER AND RELATED METHODS

TECHNICAL FIELD

The present disclosure relates generally to parametric speakers. More particularly, some embodiments relate to an ultrathin ultrasonic emitter.

BACKGROUND OF THE INVENTION

Non-linear transduction results from the introduction of sufficiently intense, audio-modulated ultrasonic signals into an air column. Self-demodulation, or down-conversion, occurs along the air column resulting in the production of an audible acoustic signal. This process occurs because of the known physical principle that when two sound waves with different frequencies are radiated simultaneously in the same medium, a modulated waveform including the sum and difference of the two frequencies is produced by the non-linear (parametric) interaction of the two sound waves. When the two original sound waves are ultrasonic waves and the difference between them is selected to be an audio frequency, an audible sound can be generated by the parametric interaction.

Parametric audio reproduction systems produce sound through the heterodyning of two acoustic signals in a non-linear process that occurs in a medium such as air. The acoustic signals are typically in the ultrasound frequency range. The non-linearity of the medium results in acoustic signals produced by the medium that are the sum and difference of the acoustic signals. Thus, two ultrasound signals that are separated in frequency can result in a difference tone that is within the 60 Hz to 20,000 Hz range of human hearing.

SUMMARY

Embodiments of the technology described herein include an ultrasonic audio speaker system, comprising an emitter and a driver. In various embodiments, the emitter includes a first layer having a conductive surface; a second layer having a conductive surface; and an insulating layer disposed between the first and second conductive surfaces, wherein the first and second layers are disposed in touching relation to the insulating layer. The driver circuit can include two inputs configured to be coupled to receive an audio modulated ultrasonic signal from an amplifier and two outputs, wherein a first output is coupled to the conductive surface of the first layer and the second output is coupled to the conductive surface of the second layer.

Either or both of the conductive layers can be made using a metalized film in which a metalized conductive layer is deposited onto a film substrate. The substrate can be, for example, polypropylene, polyimide, polyethylene terephthalate (PET), axially-oriented polyethylene terephthalate, biaxially-oriented polyethylene terephthalate (e.g., Mylar, Melinex or Hostaphan), Kapton, or other substrate. The insulating layer can be the substrate of the metalized film or it can be a separate insulating layer.

In various embodiments, the ultrasonic emitter further includes a screen or grating disposed adjacent the first conductive layer. In some embodiments, the first conductive layer comprises a metalized film and the second conductive layer comprises a conductive grating. In further embodiments, the second conductive layer comprises a conductive grating.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the accompanying figures. The drawings are provided for purposes of illustration only and merely depict typical or example embodiments of the invention. These drawings are provided to facilitate the reader's understanding of the systems and methods described herein, and shall not be considered limiting of the breadth, scope, or applicability of the claimed invention.

Some of the figures included herein illustrate various embodiments of the invention from different viewing angles. Although the accompanying descriptive text may refer to elements depicted therein as being on the "top," "bottom" or "side" of an apparatus, such references are merely descriptive and do not imply or require that the invention be implemented or used in a particular spatial orientation unless explicitly stated otherwise.

FIG. 6*a* is a diagram illustrating an example of a simple driver circuit that can be used to drive the emitters disclosed herein.

FIG. 6*b* is a diagram illustrating a cutaway view of an example of a pot core that can be used to form a pot-core inductor.

The figures are not intended to be exhaustive or to limit the invention to the precise form disclosed. It should be understood that the invention can be practiced with modification and alteration, and that the invention be limited only by the claims and the equivalents thereof.

DESCRIPTION

Embodiments of the systems and methods described herein provide a HyperSonic Sound (HSS) audio system or other ultrasonic audio system for a variety of different applications. Certain embodiments provide a thin film ultrasonic emitter for ultrasonic carrier audio applications.

Figure 1:
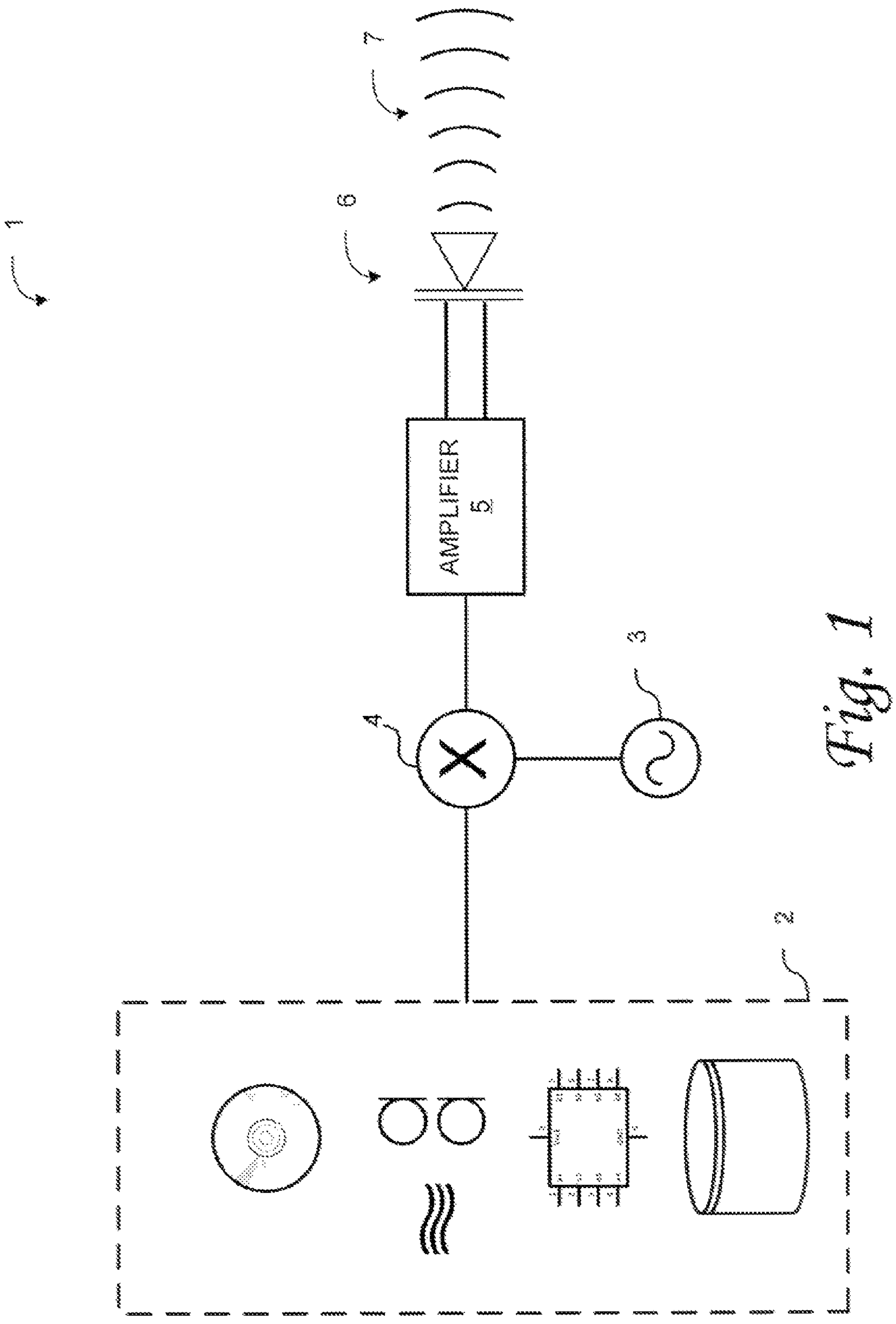
FIG. 1 is a diagram illustrating an ultrasonic sound system suitable for use with the emitter technology described herein.

FIG. 1 is a diagram illustrating an ultrasonic sound system suitable for use with the systems and methods described herein. In this exemplary ultrasonic system 1, audio content from an audio source 2, such as, for example, a microphone, memory, a data storage device, streaming media source, CD, DVD or other audio source is received. The audio content may be decoded and converted from digital to analog form, depending on the source. The audio content received by the audio system 1 is modulated onto an ultrasonic carrier of frequency f1, using a modulator. The modulator typically includes a local oscillator 3 to generate the ultrasonic carrier signal, and multiplier 4 to multiply the audio signal by the carrier signal. The resultant signal is a double- or single-sideband signal with a carrier at frequency f1. In some embodiments, signal is a parametric ultrasonic wave or an HSS signal. In most cases, the modulation scheme used is amplitude modulation, or AM. AM can be achieved by multiplying the ultrasonic carrier by the information-carrying signal, which in this case is the audio signal. The spectrum of the modulated signal has two sidebands, an upper and a lower side band, which are symmetric with respect to the carrier frequency, and the carrier itself.

The modulated ultrasonic signal is provided to the transducer 6, which launches the ultrasonic wave into the air creating ultrasonic wave 7. When played back through the transducer at a sufficiently high sound pressure level, due to nonlinear behavior of the air through which it is 'played' or transmitted, the carrier in the signal mixes with the sideband (s) to demodulate the signal and reproduce the audio content. This is sometimes referred to as self-demodulation. Thus, even for single-sideband implementations, the carrier is included with the launched signal so that self-demodulation can take place. Although the system illustrated in FIG. 3 uses a single transducer to launch a single channel of audio content, one of ordinary skill in the art after reading this description will understand how multiple mixers, amplifiers and transducers can be used to transmit multiple channels of audio using ultrasonic carriers.

Figure 2:
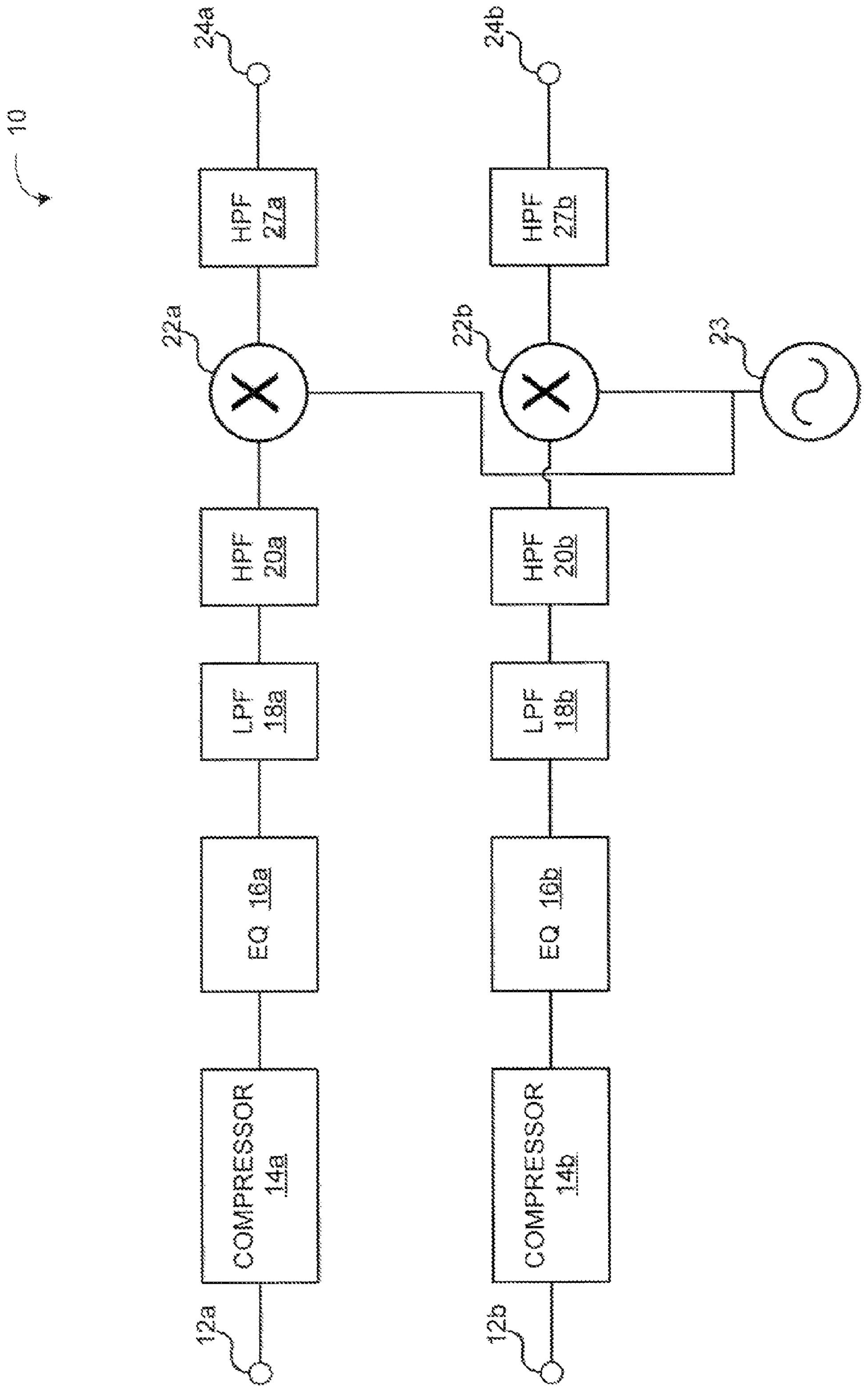
FIG. 2 is a diagram illustrating another example of a signal processing system that is suitable for use with the emitter technology described herein.

One example of a signal processing system 10 that is suitable for use with the technology described herein is illustrated schematically in FIG. 2. In this embodiment, various processing circuits or components are illustrated in the order (relative to the processing path of the signal) in which they are arranged according to one implementation. It is to be understood that the components of the processing circuit can vary, as can the order in which the input signal is processed by each circuit or component. Also, depending upon the embodiment, the processing system 10 can include more or fewer components or circuits than those shown.

Also, the example shown in FIG. 1 is optimized for use in processing two input and output channels (e.g., a "stereo" signal), with various components or circuits including substantially matching components for each channel of the signal. It will be understood by one of ordinary skill in the art after reading this description that the audio system can be implemented using a single channel (e.g., a "monaural" or "mono" signal), two channels (as illustrated in FIG. 2), or a greater number of channels.

Referring now to FIG. 2, the example signal processing system 10 can include audio inputs that can correspond to left 12*a* and right 12*b* channels of an audio input signal. Compressor circuits 14*a*, 14*b* can be included to compress the dynamic range of the incoming signal, effectively raising the amplitude of certain portions of the incoming signals and lowering the amplitude of certain other portions of the incoming signals. More particularly, compressor circuits 14*a*, 14*b* can be included to narrow the range of audio amplitudes. In one aspect, the compressors lessen the peak-to-peak amplitude of the input signals by a ratio of not less than about 2:1. Adjusting the input signals to a narrower range of amplitude can be done to minimize distortion, which is characteristic of the limited dynamic range of this class of modulation systems.

After the audio signals are compressed, equalizing networks 16*a*, 16*b* can be included to provide equalization of the signal. The equalization networks can, for example, boost or suppress predetermined frequencies or frequency ranges to increase the benefit provided naturally by the emitter/inductor combination of the parametric emitter assembly.

Low pass filter circuits 18*a*, 18*b* can be included to provide a cutoff of high portions of the signal, and high pass filter circuits 20*a*, 20*b* providing a cutoff of low portions of the audio signals. In one exemplary embodiment, low pass filters 18*a*, 18*b* are used to cut signals higher than about 15-20 kHz, and high pass filters 20*a*, 20*b* are used to cut signals lower than about 20-200 Hz.

The high pass filters 20*a*, 20*b* can be configured to eliminate low frequencies that, after modulation, would result in deviation of carrier frequency (e.g., those portions of the modulated signal of FIG. 6 that are closest to the carrier frequency). Also, some low frequencies are difficult for the system to reproduce efficiently and as a result, much energy can be wasted trying to reproduce these frequencies. Therefore, high pass filters 20*a*, 20*b* can be configured to cut out these frequencies.

The low pass filters 18*a*, 18*b* can be configured to eliminate higher frequencies that, after modulation, could result in the creation of an audible beat signal with the carrier. By way of example, if a low pass filter cuts frequencies above 15 kHz, and the carrier frequency is approximately 44 kHz, the difference signal will not be lower than around 29 kHz, which is still outside of the audible range for humans. However, if frequencies as high as 25 kHz were allowed to pass the filter circuit, the difference signal generated could be in the range of 19 kHz, which is within the range of human hearing.

In the example system 10, after passing through the low pass and high pass filters, the audio signals are modulated by modulators 22*a*, 22*b*. Modulators 22*a*, 22*b*, mix or combine the audio signals with a carrier signal generated by oscillator 23. For example, in some embodiments a single oscillator (which in one embodiment is driven at a selected frequency of 40 kHz to 50 kHz, which range corresponds to readily available crystals that can be used in the oscillator) is used to drive both modulators 22*a*, 22*b*. By utilizing a single oscillator for multiple modulators, an identical carrier frequency is provided to multiple channels being output at 24*a*, 24*b* from the modulators. Using the same carrier frequency for each channel lessens the risk that any audible beat frequencies may occur.

High-pass filters 27*a*, 27*b* can also be included after the modulation stage. High-pass filters 27*a*, 27*b* can be used to pass the modulated ultrasonic carrier signal and ensure that no audio frequencies enter the amplifier via outputs 24*a*, 24*b*. Accordingly, in some embodiments, high-pass filters 27*a*, 27*b* can be configured to filter out signals below about 25 kHz.

Figure 3:
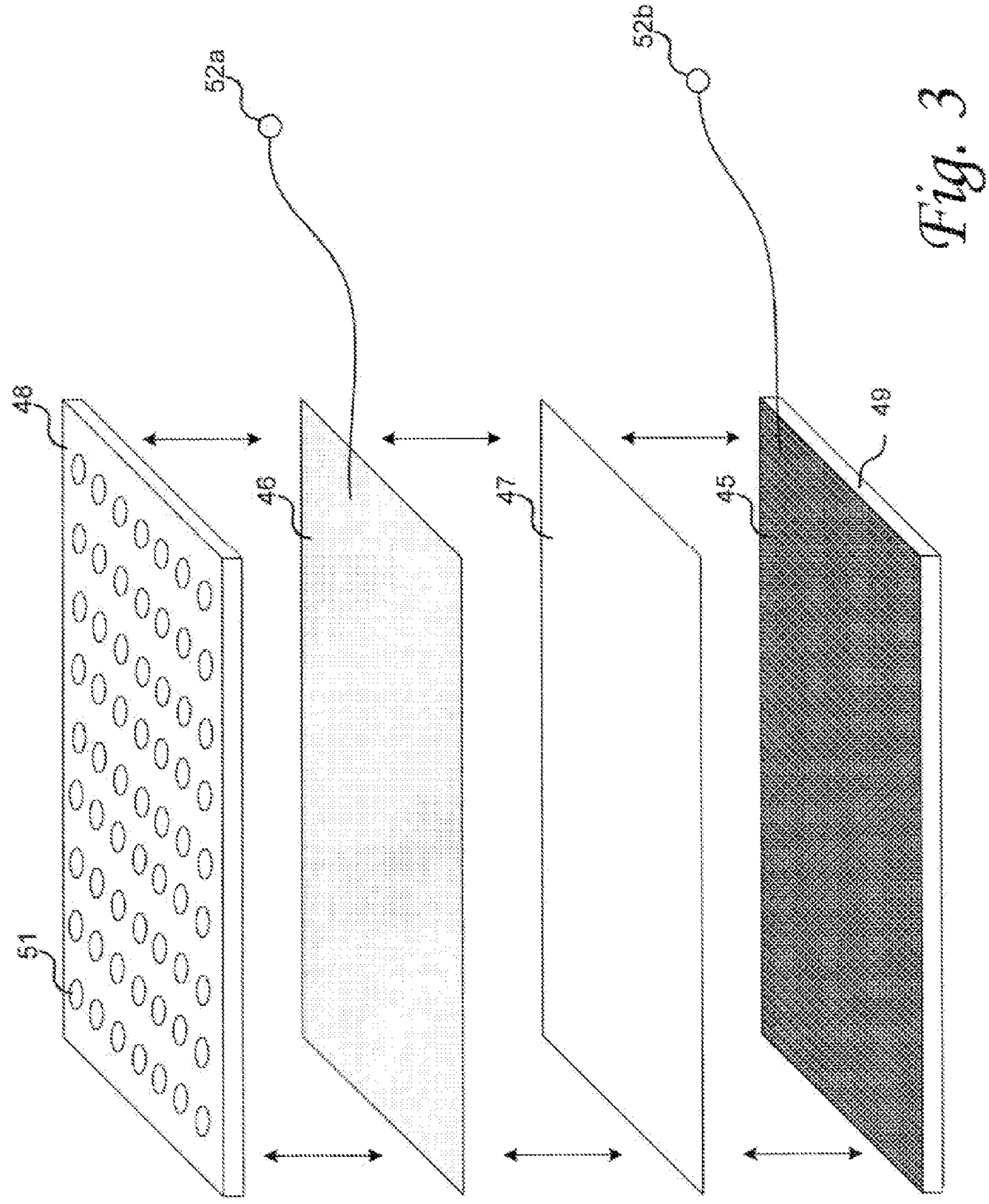
FIG. 3 is a blow-up diagram illustrating an example emitter in accordance with one embodiment of the technology described herein.

FIG. 3 is a blow-up diagram illustrating an example emitter in accordance with one embodiment of the technology described herein. The example emitter shown in FIG. 3 includes one conductive surface 45, another conductive surface 46, an insulating layer 47 and a grating 48. In the illustrated example, conductive layer 45 is disposed on a backing plate 49. In various embodiments, backing plate 49 is a non-conductive backing plate and serves to insulate conductive surface 45 on the back side. For example, conductive surface 45 and backing plate 49 can be implemented as a metalized layer deposited on a non-conductive, or relatively low conductivity, substrate.

As a further example, conductive surface 45 and backing plate 49 can be implemented as a printed circuit board (or other like material) with a metalized layer deposited thereon. As another example, conductive surface 45 can be laminated or sputtered onto backing plate 49, or applied to backing plate 49 using various deposition techniques, including vapor or evaporative deposition, and thermal spray, to name a few. As yet another example, conductive layer 45 can be a metalized film.

Conductive surface 45 can be a continuous surface or it can have slots, holes, cut-outs of various shapes, or other non-conductive areas. Additionally, conductive surface 45 can be a smooth or substantially smooth surface, or it can be rough or pitted. For example, conductive surface 45 can be embossed, stamped, sanded, sand blasted, formed with pits or irregularities in the surface, deposited with a desired degree of 'orange peel' or otherwise provided with texture.

Conductive surface 45 need not be disposed on a dedicated backing plate 49. Instead, in some embodiments, conductive surface 45 can be deposited onto a member that provides another function, such as a member that is part of a speaker housing. Conductive surface 45 can also be deposited directly onto a wall or other location where the emitter is to be mounted, and so on.

Conductive surface 46 provides another pole of the emitter. Conductive surface can be implemented as a metalized film, wherein a metalized layer is deposited onto a film substrate (not separately illustrated). The substrate can be, for example, polypropylene, polyimide, polyethylene terephthalate (PET), biaxially-oriented polyethylene terephthalate (e.g., Mylar, Melinex or Hostaphan), Kapton, or other substrate. In some embodiments, the substrate has low conductivity and, when positioned so that the substrate is between the conductive surfaces of layers 45 and 46, acts as an insulator between conductive surface 45 and conductive surface 46.

In addition, in some embodiments conductive surface 46 (and its insulating substrate where included) is separated from conductive surface 45 by an insulating layer 47. Insulating layer 47 can be made, for example, using PET, axially or biaxially-oriented polyethylene terephthalate, polypropylene, polyimide, or other insulative film or material.

To drive the emitter with enough power to get sufficient ultrasonic pressure level, arcing can occur where the spacing between conductive surface 46 and conductive surface 45 is too thin. However, where the spacing is too thick, the emitter won't achieve resonance. In one embodiment, insulating layer 47 is a layer of about 0.92 mil in thickness. In some embodiments, insulating layer 47 is a layer from about 0.90 to about 1 mil in thickness. In further embodiments, insulating layer 47 is a layer from about 0.75 to about 1.2 mil in thickness. In still further embodiments, insulating layer 47 is as thin as about 0.33 or 0.25 mil in thickness. Other thicknesses can be used, and in some embodiments a separate insulating layer 47 is not provided. For example, some embodiments rely on an insulating substrate of conductive layer 46 (e.g., as in the case of a metalized film) to provide insulation between conductive surfaces 45 and 46. One benefit of including an insulating layer 47 is that it can allow a greater level of bias voltage to be applied across the first and second conductive surfaces 45, 46 without arcing. When considering the insulative properties of the materials between the two conductive surfaces 45, 46, one should consider the insulative value of layer 47, if included, and the insulative value of the substrate, if any, on which conductive layer 46 is deposited.

A grating 48 can be included on top of the stack. Grating 48 can be made of a conductive or non-conductive material. In some embodiments, grating 48 can be the grating that forms the external speaker grating for the speaker. Because grating 48 is in contact in some embodiments with the conductive surface 46, grating 48 can be made using a non-conductive material to shield users from the bias voltage present on conductive surface 46. Grating 48 can include holes 51, slots or other openings. These openings can be uniform, or they can vary across the area, and they can be thru-openings extending from one surface of grating 48 to the other. Grating 48 can be of various thicknesses. For example, grating 48 can be approximately 60 mils, although other thicknesses can be used.

Electrical contacts 52*a*, 52*b* are used to couple the modulated carrier signal into the emitter. An example of a driver circuit for the emitter is described below.

Figure 4:
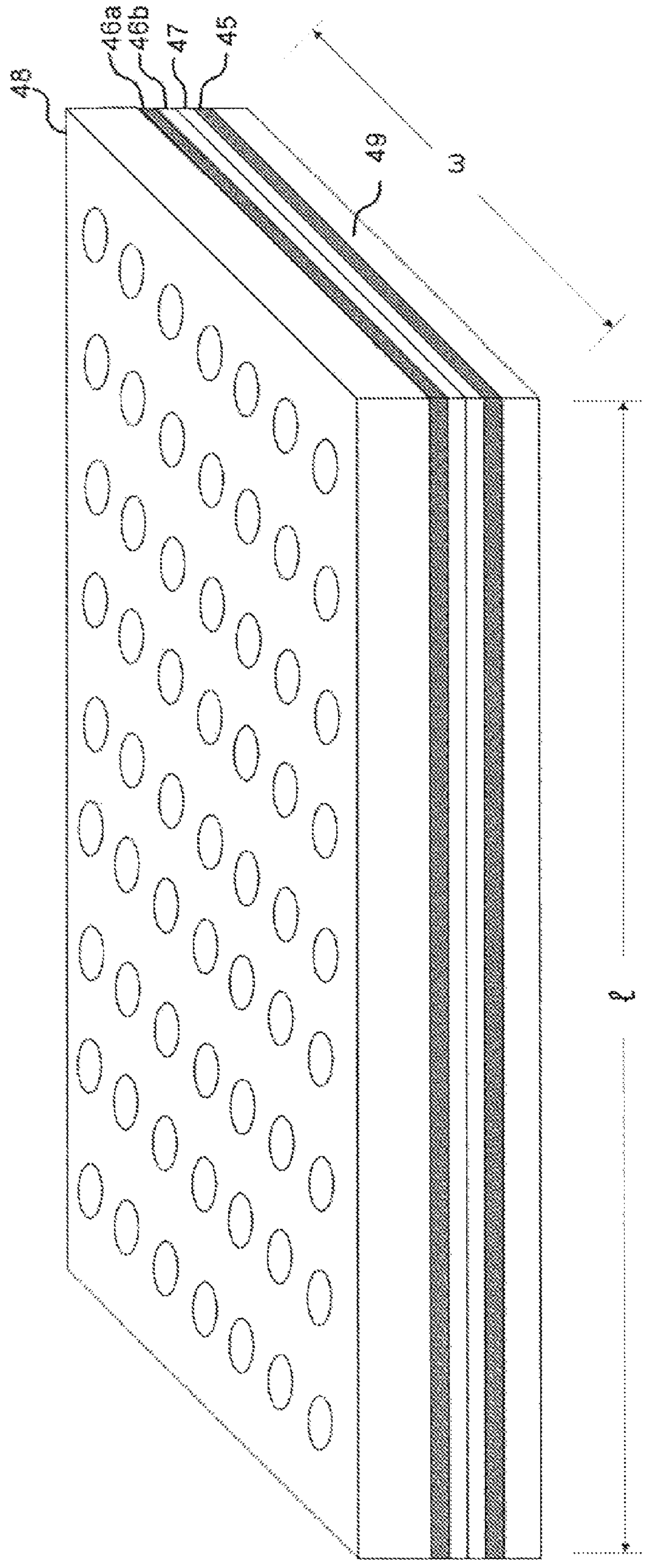
FIG. 4 is a diagram illustrating a cross sectional view of an assembled emitter in accordance with the example illustrated in FIG. 3.

FIG. 4 is a diagram illustrating a cross sectional view of an assembled emitter in accordance with the example illustrated in FIG. 3. As illustrated, this embodiment includes backing plate 49, conductive surface 45, conductive surface 46 (comprising a conductive surface 46*a* deposited on a substrate 46*b*), insulating layer 47 between conductive surface 45 and conductive surface 46*a*, and grating 48. The dimensions in these and other figures, and particularly the thicknesses of the layers, are not drawn to scale.

The emitter can be made to just about any dimension. In one application the emitter is of length, l, 10 inches and its width, ω, is 5 inches although other dimensions, both larger and smaller are possible. Practical ranges of length and width can be similar lengths and widths of conventional bookshelf speakers. Greater emitter area can lead to a greater sound output, but may also require higher bias voltages.

Table 1 describes examples of metalized films that can be used to provide conductive surface 46. Low sheet resistance or low ohms/square is preferred for conductive surface 46. Accordingly, films on table 1 having <5 and <1 Ohms/Square exhibited better performance than films with higher Ohms/Square resistance. Films exhibiting 2 k or greater Ohms/Square did not provide high output levels in development testing. Kapton can be a desirable material because it is relatively temperature insensitive in temperature ranges expected for operation of the emitter. Polypropylene may be less desirable due to its relatively low capacitance. A lower capacitance in the emitter means a larger inductance (and hence a physically larger inductor) is needed to form a resonant circuit. As table 1 illustrates, films used to provide conductive surface 46 can range from about 0.25 mil to 3 mils, inclusive of the substrate.

TABLE 1

| Thickness | Material | Ohms/Sq |
|---|---|---|
| 3 mil | Mylar | 2000 |
| .8 mil | Polypropylene | 5 |
| 3 mil | Meta Material | 2000+ |
| ¼ mil | Mylar | 2000+ |
| ¼ mil | Mylar | 2000+ |
| ¼ mil | Mylar | 2000+ |
| ¼ mil | Mylar | 2000+ |
| 3 mil | Mylar | 168 |
| .8 mil | Polypropylene | <10 |
| .92 mil | Mylar | 100 |
| 2 mil | Mylar | 160 |
| .8 mil | Polypropylene | 93 |
| 3 mil | Mylar | <1 |

TABLE 1-continued

| Thickness | Material | Ohms/Sq |
|---|---|---|
| 1.67 | Polypropylene | 100 |
| .8 mil | Polypropylene | 43 |
| 3 mil | Mylar | <1 |
| 3 mil | Kapton | 49.5 |
| 3 mil | Mylar | <5 |
| 3 mil | Meta material | |
| 3 mil | Mylar | <5 |
| 3 mil | Mylar | <1 |
| 1 mil | Kapton | <1 |
| ¼ mil | Mylar | 5 |
| .92 mil | Mylar | 10 |

Although not shown in table 1, another film that can be used to provide conductive surface 46 is the DE 320 Aluminum/Polyimide film available from the Dunmore Corporation. This film is a polyimide-based product, aluminized on two sides. It is approximately 1 mil in thickness and provides <1 Ohms/Square. As these examples illustrate, any of a number of different metalized films can be provided as conductive surfaces 45, 46. Metalization is typically performed using sputtering or a physical vapor deposition process. Aluminum, nickel, chromium, copper or other conductive materials can be used as the metallic layer, keeping in mind the preference for low Ohms/Square material.

Metalized films typically have a natural resonant frequency at which they will resonate. For some films, their natural resonant frequency can be in the range of approximately 30-60 kHz. For example, some 0.33 mil Kapton films resonate at approximately 54 kHz, while some 1.0 mil Kapton films resonate at about 34 kHz. Accordingly, the film and the carrier frequency of the ultrasonic carrier can be chosen such that the carrier frequency matches the resonant frequency of the film. Selecting a carrier frequency at the resonant frequency of the film can increase the output of the emitter.

Figure 5:
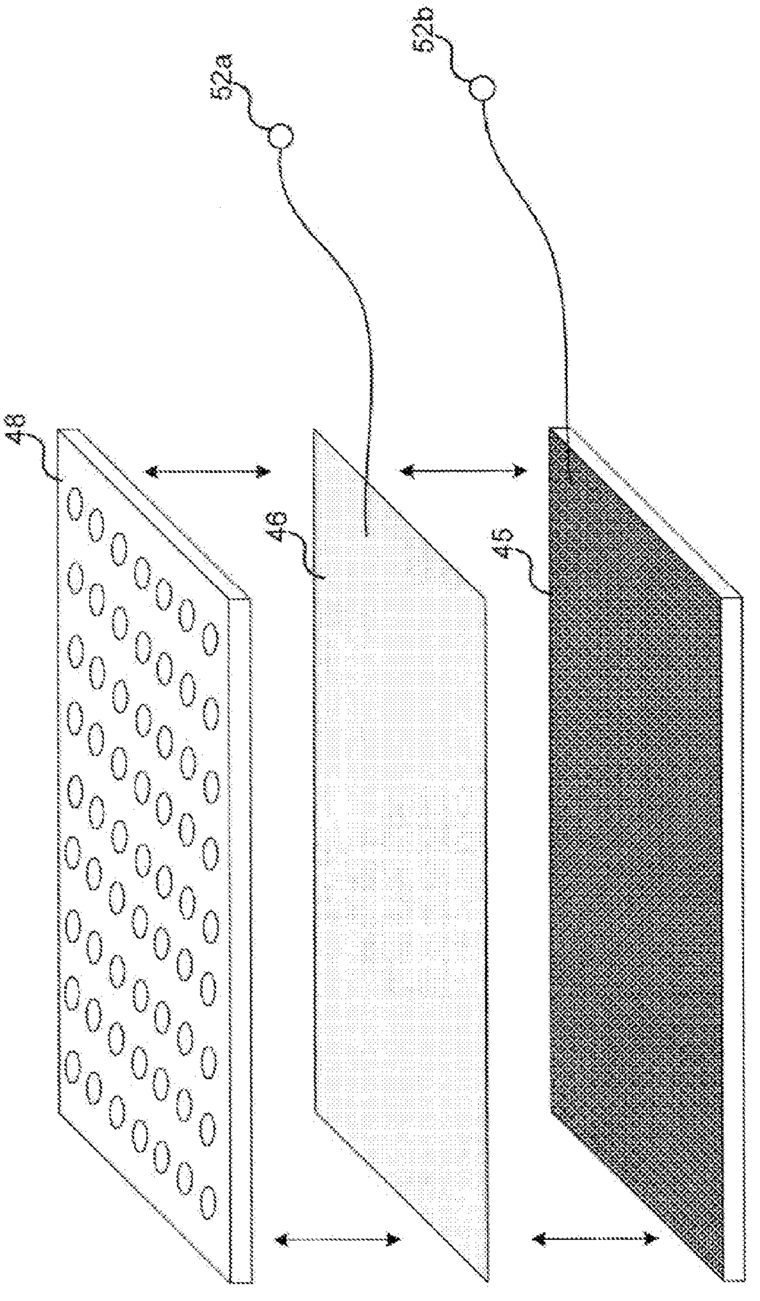
FIG. 5 is a diagram illustrating another example configuration of an ultrasonic emitter in accordance with one embodiment of the technology described herein.

FIG. 5 is a diagram illustrating another example configuration of an ultrasonic emitter in accordance with one embodiment of the technology described herein. The example in FIG. 5 includes conductive surfaces 45 and 46 and grating 48. The difference between the embodiment shown in FIG. 5, and that shown in FIGS. 3 and 4 is that the embodiment shown in FIG. 5 does not include separate insulating layer 47. Layers 45, 46 and 48 can be implemented using the same materials as described above with reference to FIGS. 3 and 4. Particularly, to avoid shorting or arcing between conductive surfaces 45, 46, conductive surface 46 is deposited on a substrate with insulative properties. For example, metalized Mylar or Kapton films like the films shown in Table 1 can be used to implement conductive surface 46, with the film oriented such that the insulating substrate is positioned between conductive surfaces 45, 46.

FIG. 6*a* is a diagram illustrating an example of a simple driver circuit that can be used to drive the emitters disclosed herein. As would be appreciated by one of ordinary skill in the art, where multiple emitters are used (e.g., for stereo applications), a driver circuit 50 can be provided for each emitter. In some embodiments, the driver circuit 50 is provided in the same housing or assembly as the emitter. In other embodiments, the driver circuit 50 is provided in a separate housing.

Typically, the modulated signal from the signal processing system 10 is electronically coupled to an amplifier (not shown). The amplifier can be part of, and in the same housing or enclosure as driver circuit 50. Alternatively, the amplifier can be separately housed. After amplification, the signal is delivered to inputs A1, A2 of driver circuit 50. In the embodiments described herein, the emitter assembly includes an emitter that can be operable at ultrasonic frequencies. The emitter (not shown in FIG. 6) is connected to driver circuit 50 at contacts D1. D2. An inductor 54 forms a parallel resonant circuit with the emitter. By configuring the inductor 54 in parallel with the emitter, the current circulates through the inductor and emitter and a parallel resonant circuit can be achieved. Accordingly, the capacitance of the emitter becomes important, because lower capacitance values of the emitter require a larger inductance to achieve resonance at a desired frequency. Accordingly, capacitance values of the layers, and of the emitter as a whole can be an important consideration in emitter design.

Arranging inductor 54 in parallel with the emitter can provide advantages over series arrangement. For example, in this configuration, resonance can be achieved in the inductor-emitter circuit without the direct presence of the amplifier in the current path. This can result in more stable and predictable performance of the emitter, and less power being wasted as compared to series configuration.

Obtaining resonance at optimal system performance can improve the efficiency of the system (that is, reduce the power consumed by the system) and reduce the heat produced by the system.

With a series arrangement, the circuit causes wasted current to flow through the inductor. As is known in the art, the emitter will perform best at (or near) the point where electrical resonance is achieved in the circuit. However, the amplifier introduces changes in the circuit, which can vary by temperature, signal variance, system performance, etc. Thus, it can be more difficult to obtain (and maintain) stable resonance in the circuit when the inductor 54 is oriented in series with the emitter (and the amplifier).

Inductor 54 can be of a variety of types known to those of ordinary skill in the art. However, inductors generate a magnetic field that can "leak" beyond the confines of the inductor. This field can interfere with the operation and/or response of the emitter. Also, many inductor/emitter pairs used in ultrasonic sound applications operate at voltages that generate large amounts of thermal energy. Heat can also negatively affect the performance of a parametric emitter.

For at least these reasons, in most conventional parametric sound systems the inductor is physically located a considerable distance from the emitter. While this solution addresses the issues outlined above, it adds another complication. The signal carried from the inductor to the emitter is can be a relatively high voltage (on the order of 160 V peak-to-peak or higher). As such, the wiring connecting the inductor to the emitter must be rated for high voltage applications. Also, long runs of the wiring may be necessary in certain installations, which can be both expensive and dangerous, and can also interfere with communication systems not related to the parametric emitter system.

The inductor 54 (including as a component as shown in the configuration of FIG. 6*a*) can be implemented using a pot core inductor. A pot core inductor is housed within a pot core that is typically formed of a ferrite material. This confines the inductor windings and the magnetic field generated by the inductor. Typically, the pot core includes two ferrite halves 59*a*, 59*b* that define a cavity 60 within which the windings of the inductor can be disposed. See FIG. 6*b*. An air gap G can be included to increase the permeability of the pot core without affecting the shielding capability of the core. Thus, by increasing the size of the air gap G, the permeability of the pot core is increased. However, increasing the air gap G also requires an increase in the number of turns in the inductor(s) held within the pot core in order to achieve a desired amount of inductance. Thus, an air gap can increase permeability and at the same time reduce heat generated by the pot core inductor, without compromising the shielding properties of the core.

In the example illustrated in FIG. 6*a*, a dual-winding step-up transformer is used. However the primary 55 and secondary 56 windings can be combined in what is commonly referred to as an autotransformer configuration. Either or both the primary and secondary windings can be contained within the pot core.

As discussed above, it is desirable to achieve a parallel resonant circuit with inductor 54 and the emitter. It is also desirable to match the impedance of the inductor/emitter pair with the impedence expected by the amplifier. This generally requires increasing the impedance of the inductor emitter pair. It may also be desirable to achieve these objectives while locating the inductor physically near the emitter. Therefore, in some embodiments, the air gap of the pot core is selected such that the number of turns in the primary winding 55 present the impedance load expected by the amplifier. In this way, each loop of the circuit can be tuned to operate at an increased efficiency level. Increasing the air gap in the pot core provides the ability to increase the number of turns in inductor element 55 without changing the desired inductance of inductor element 56 (which would otherwise affect the resonance in the emitter loop). This, in turn, provides the ability to adjust the number of turns in inductor element 55 to match the impedance load expected by the amplifier.

An additional benefit of increasing the size of the air gap is that the physical size of the pot core can be reduced. Accordingly, a smaller pot core transformer can be used while still providing the same inductance to create resonance with the emitter.

The use of a step-up transformer provides additional advantages to the present system. Because the transformer "steps-up" from the direction of the amplifier to the emitter, it necessarily "steps-down" from the direction of the emitter to the amplifier. Thus, any negative feedback that might otherwise travel from the inductor/emitter pair to the amplifier is reduced by the step-down process, thus minimizing the effect of any such event on the amplifier and the system in general (in particular, changes in the inductor/emitter pair that might affect the impedance load experienced by the amplifier are reduced).

In one embodiment, 30/46 enameled Litz wire is used for the primary and secondary windings. Litz wire comprises many thin wire strands, individually insulated and twisted or woven together. Litz wire uses a plurality of thin, individually insulated conductors in parallel. The diameter of the individual conductors is chosen to be less than a skin-depth at the operating frequency, so that the strands do not suffer an appreciable skin effect loss. Accordingly, Litz wire can allow better performance at higher frequencies.

A bias voltage is applied across terminals 81, 82 to provide bias to the emitter. Full wave rectifier 57 and filter capacitor 58 provide a DC bias to the circuit across the emitter inputs D1, D2. Ideally, the bias voltage used is approximately twice (or greater) the reverse bias that the emitter is expected to take on. This is to ensure that bias voltage is sufficient to pull the emitter out of a reverse bias state. In one embodiment, the bias voltage is on the order of 420 Volts. In other embodiments, other bias voltages can be used. For ultrasonic emitters, bias voltages are typically in the range of a few hundred to several hundred volts.

Although not shown in the figures, where the bias voltage is high enough, arcing can occur between conductive layers 45, 46. This arcing can occur through the intermediate insulating layers as well as at the edges of the emitter (around the outer edges of the insulating layers. Accordingly, the insulating layer 47 can be made larger in length and width than conductive surfaces 45, 46, to prevent edge arcing. Likewise, where conductive layer 46 is a metalized film on an insulating substrate, conductive layer 46 can be made larger in length and width than conductive layer 45, to increase the distance from the edges of conductive layer 46 to the edges of conductive layer 45.

Resistor R1 can be included to lower or flatten the Q factor of the resonant circuit. Resistor R1 is not needed in all cases and air as a load will naturally lower the Q. Likewise, thinner Litz wire in inductor 54 can also lower the Q so the peak isn't overly sharp.

Figure 7:
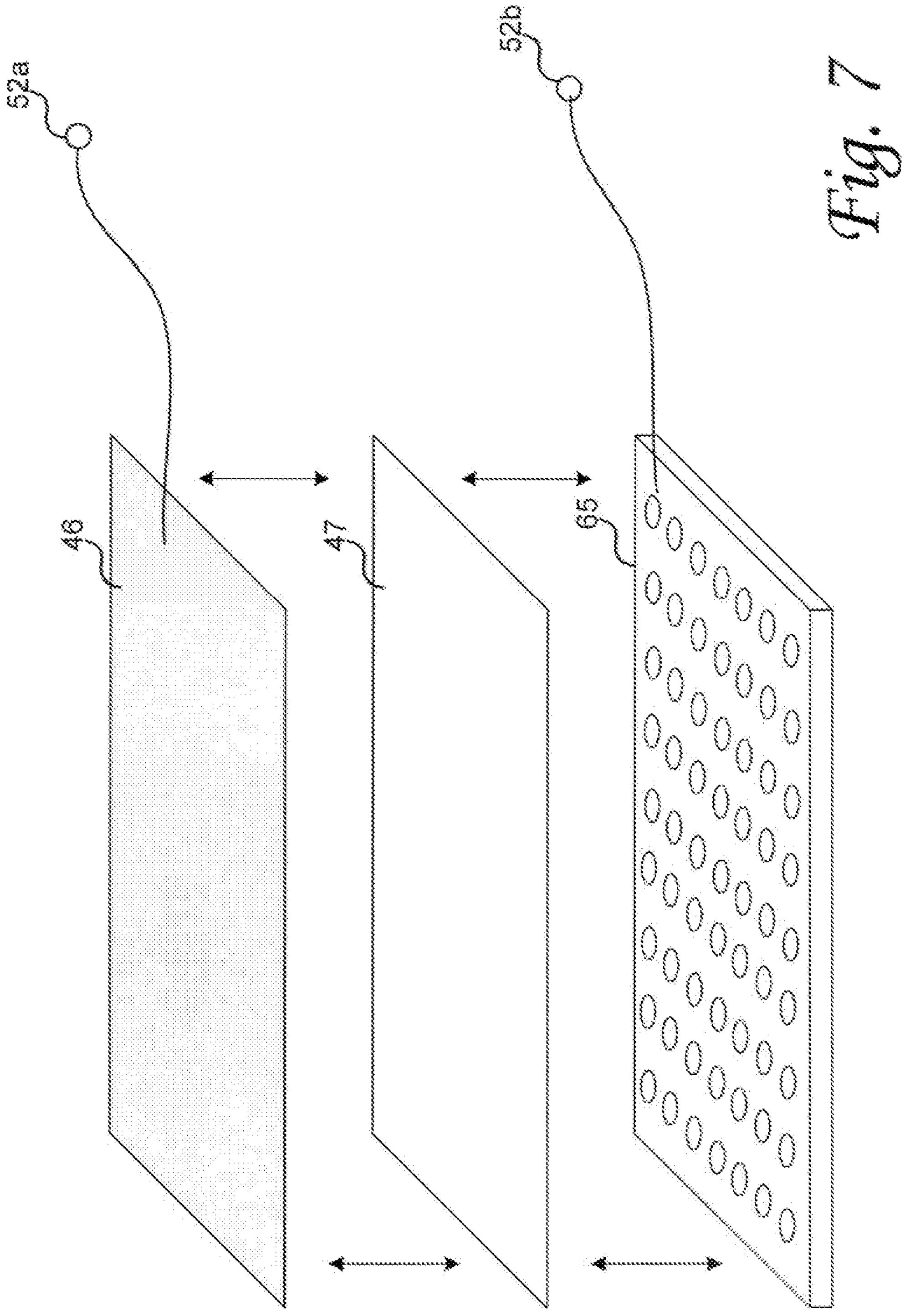
FIG. 7 is a diagram illustrating another example emitter configuration in accordance with one embodiment of the technology described herein.

FIG. 7 is a diagram illustrating another example emitter configuration in accordance with one embodiment of the technology described herein. The emitter in this configuration includes a conductive grating 65 as the bottom layer, an insulating middle layer 47 and an upper conductive layer 46. Layers 46 and 47 can be implemented using the examples for layers 46 and 47 described above with reference to FIGS. 3 and 4. Conductive grating 65 can be made using a conductive material, or a material with a conductive surface or coating. Because conductive grating 65 forms one of the emitter electrodes, an input lead 52*b* is connected to conductive grating 65.

Conductive grating 65 can have a pattern of holes, slots or other openings. In some embodiments, the openings make up approximately 50% of the area of conductive grating 65. In other embodiments, the openings can make up a greater or lesser percentage of the area of conductive grating 65. Conductive grating 65 can be approximately 60 mils in thickness. In other embodiments, conductive grating 65 can be of different thickness.

Figure 8:
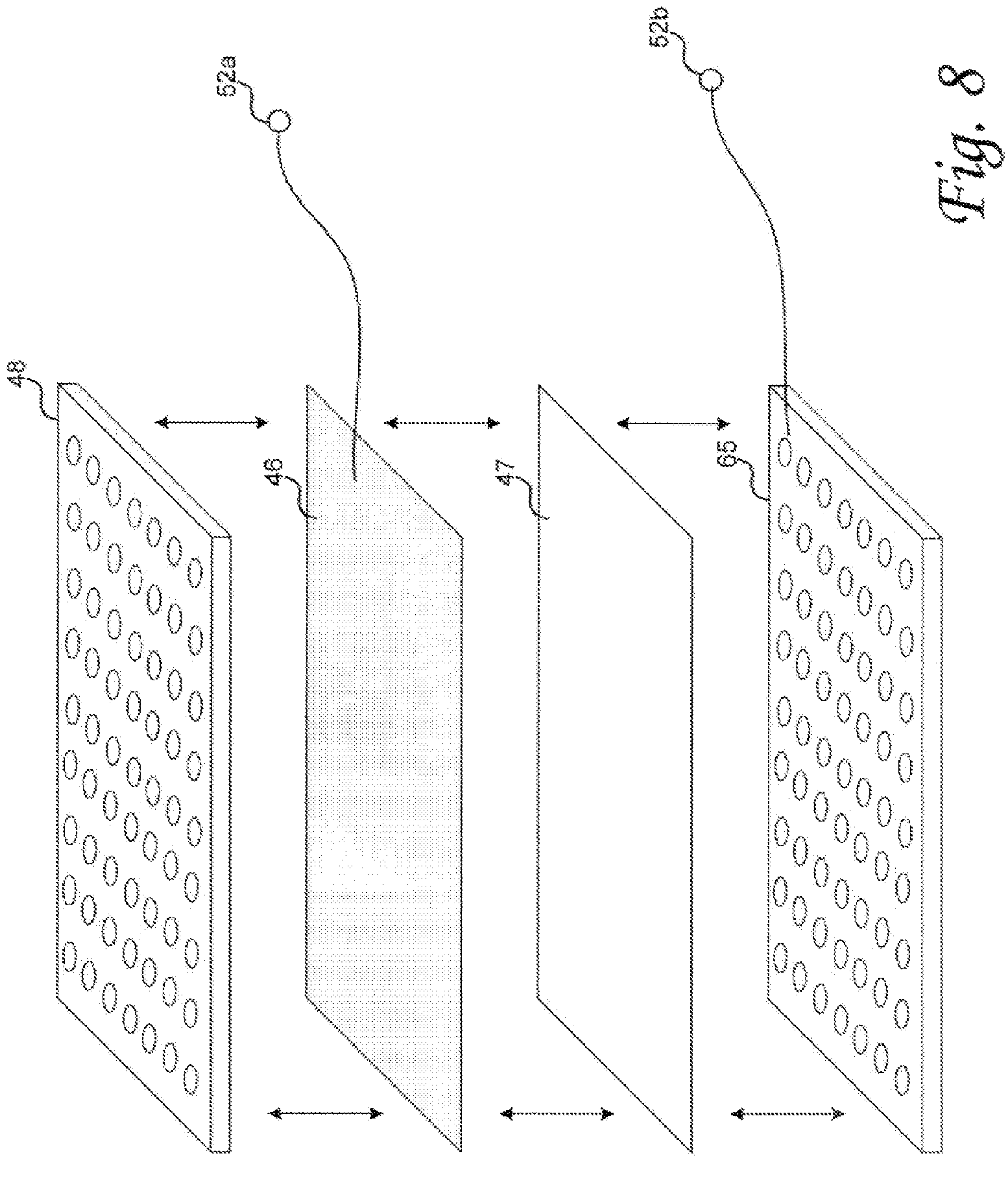
FIG. 8 is a diagram illustrating another example emitter configuration in accordance with one embodiment of the technology described herein.

FIG. 8 is a diagram illustrating another example emitter configuration in accordance with one embodiment of the technology described herein. The emitter in this configuration includes a conductive grating 65 as the bottom layer, an insulating middle layer 47 and an upper conductive layer 46 and an upper grating 48. The emitter illustrated in FIG. 8 is similar to the example illustrated in FIG. 7, with the addition of grating 48.

The layers that make up the emitters described herein can be joined together using a number of different techniques. For example, frames, clamps, clips, adhesives or other attachment mechanisms can be used to join the layers together. The layers can be joined together at the edges to avoid interfering with resonance of the emitter films.

The conductive and non-conductive layers that make up the various emitters disclosed herein can be made using flexible materials. For example, embodiments described herein use flexible metallized films to form conductive layers, and non-metalized films to form resistive layers. Because of the flexible nature of these materials, they can be molded to form desired configurations and shapes.

Figure 9B:
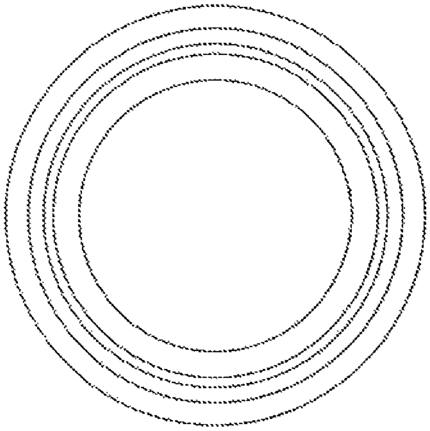
FIGS. 9*b* and 10*b* are diagrams illustrating an example of an emitter in a cylindrical configuration.
Figure 9A:
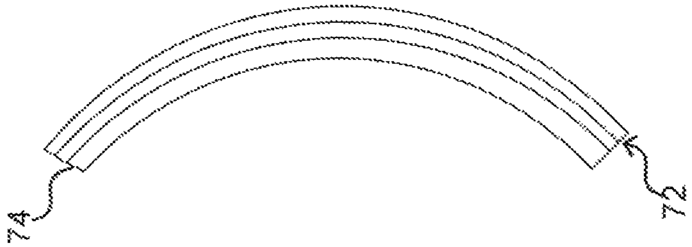
FIGS. 9*a* and 10*a* are diagrams illustrating an example of an emitter in an arcuate configuration.
Figure 10B:
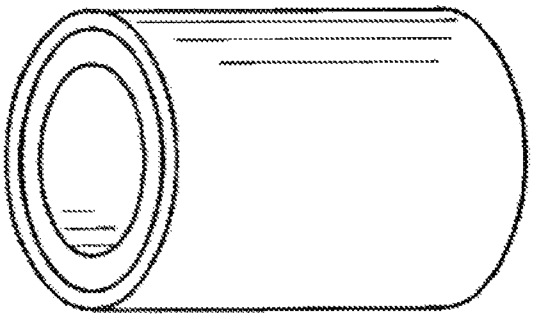
Figure 10A:
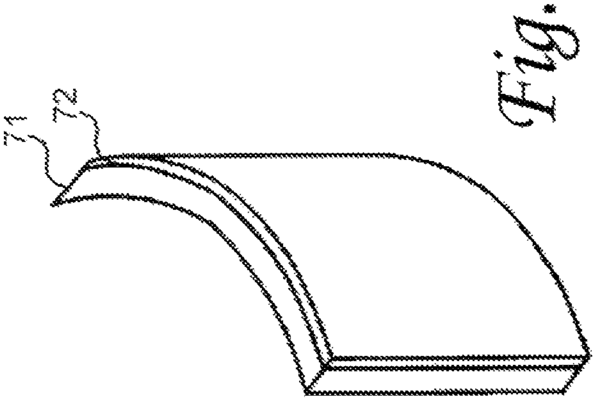

For example, as illustrated in FIG. 9A, the layers can be applied to a substrate 74 in an arcuate configuration. FIG. 10*a* provides a perspective view of an emitter formed in an arcuate configuration. In this example, a backing material 71 is molded or formed into an arcuate shape and the emitter layers 72 affixed thereto. Other examples include cylindrical (FIGS. 9*b* and 10*b*) and spherical. As would be apparent to one of ordinary skill in the art after reading this description, other shapes of backing materials or substrates can be used on which to form ultrasonic emitters in accordance with the technology disclosed herein.

Mylar, kapton and other metalized films can be tensioned or stretched to some extent. Stretching the film, and using the film in a stretched configuration can lend a higher degree of directionality to the emitter. Ultrasonic signals by their nature tend to be directional in nature. However, stretching the films yields a higher level of directionality.

Conductive layers can be made using any of a number of conductive materials. Common conductive materials that can be used include aluminum, nickel, chromium, gold, germanium, copper, silver, titanium, tungsten, platinum, and tantalum. Conductive metal alloys may also be used.

As noted above, conductive layers 45, 46 can be made using metalized films. These include, Mylar, Kapton and other like films. Such metalized films are available in varying degrees of transparency from substantially fully transparent to opaque. Likewise, insulating layer 47 can be made using a transparent film. Accordingly, emitters disclosed herein can be made of transparent materials resulting in a transparent emitter. Such an emitter can be configured to be placed on various objects to form an ultrasonic speaker. For example, one or a pair (or more) of transparent emitters can be placed as a transparent film over a television screen. This can be advantageous because as televisions become thinner and thinner, there is less room available for large speakers. Layering the emitter(s) onto the television screen allows placement of speakers without requiring additional cabinet space. As another example, an emitter can be placed on a picture frame, converting a picture into an ultrasonic emitter. Also, because metalized films can also be highly reflective, the ultrasonic emitter can be made into a mirror.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An ultrasonic audio speaker, comprising:

an emitter, the emitter comprising:

a first layer having a conductive surface comprising a metalized film having a resonant frequency;

a second layer having a conductive surface;

an insulating layer disposed between the first and second conductive surfaces, wherein the first and second layers are disposed in touching relation to the insulating layer; and a driver circuit having two inputs configured to be coupled to receive an audio modulated ultrasonic carrier signal from an amplifier and two outputs, wherein a first output is coupled to the conductive surface of the first layer and the second output is coupled to the conductive surface of the second layer, wherein the modulated ultrasonic carrier signal has a carrier frequency at the resonant frequency of the metalized film, and wherein the driver circuit comprises an inductor connected to form a parallel resonant circuit with the emitter.

2. The ultrasonic audio speaker according to claim 1, wherein the metalized film has a resistance of less than 3 ohms/square.

3. The ultrasonic audio speaker according to claim 1, wherein the metalized film has a resistance of less than 1 ohms/square.

4. The ultrasonic audio speaker according to claim 1, wherein the insulating layer is a substrate of the metalized film and the conductive surface of the first layer is the metalized portion of the metalized film.

5. The ultrasonic audio speaker according to claim 1, wherein the second conductive layer comprises a metalized film.

6. The ultrasonic audio speaker according to claim 1, further comprising a grating disposed adjacent the first conductive layer.

7. The ultrasonic audio speaker according to claim 1, wherein the second conductive layer comprises a conductive grating.

8. The ultrasonic audio speaker according to claim 1, further comprising a bias voltage source configured to apply a bias voltage across the emitter.

9. The ultrasonic audio speaker according to claim 8, wherein the bias voltage is within the range of from 200 to 500 volts.

10. The ultrasonic audio speaker according to claim 8, wherein the bias voltage, to overcome a reverse bias on the emitter, is at least twice the reverse bias.

11. The ultrasonic audio speaker according to claim 1, wherein the first conductive layer is grated.

12. An ultrasonic audio speaker, comprising:

an emitter, the emitter comprising:

a first layer comprising a metallized film having a first conductive surface disposed on a substrate, the metallized film having a resonant frequency; and a second layer having a second conductive surface; and a driver circuit having two inputs configured to be coupled to receive an ultrasonic carrier audio signal from an amplifier and two outputs, wherein a first output is coupled to the first conductive surface and the second output is coupled to the second conductive surface, wherein the ultrasonic carrier audio signal has a carrier frequency at the resonant frequency of the metallic film, and wherein the driver circuit comprises an inductor connected to form a parallel resonant circuit with the emitter.

13. The ultrasonic audio speaker according to claim 12, further comprising an insulating layer disposed between the first and second conductive surfaces.

14. The ultrasonic audio speaker according to claim 12, wherein the second conductive layers comprise a metalized film.

15. The ultrasonic audio speaker according to claim 12, further comprising a grating disposed adjacent the first conductive layer.

16. The ultrasonic audio speaker according to claim 12, wherein the second conductive layer comprises a conductive grating.

17. The ultrasonic audio speaker according to claim 12, further comprising a bias voltage source configured to apply a bias voltage across the emitter.

18. The ultrasonic audio speaker according to claim 17, wherein the bias voltage is within the range of from 200 to 500 volts.

19. The ultrasonic audio speaker according to claim 17, wherein the bias voltage, to overcome a reverse bias on the emitter, is at least twice the reverse bias.

20. The ultrasonic audio speaker according to claim 12, wherein the second conductive surface comprises a rough or pitted surface.

* * * * *